United States Patent [19]

Bonewitz et al.

[11] 4,392,715
[45] Jul. 12, 1983

[54] OPTICAL FIBER

[75] Inventors: Hans-Ulrich Bonewitz, Hammersbach; Albert Muhlich, Frankfurt; Karlheinz Rau, Hanau, all of Fed. Rep. of Germany

[73] Assignee: Heraeus Quarzschmelze GmbH, Hanau, Fed. Rep. of Germany

[21] Appl. No.: 122,088

[22] Filed: Feb. 19, 1980

[30] Foreign Application Priority Data

Feb. 27, 1979 [DE] Fed. Rep. of Germany ....... 2907650

[51] Int. Cl.³ ............................................. G02B 5/172
[52] U.S. Cl. ................................. 350/96.33; 350/96.34
[58] Field of Search ............... 350/96.30, 96.31, 96.33, 350/96.34

[56] References Cited

U.S. PATENT DOCUMENTS

| | | | |
|---|---|---|---|
| 3,869,194 | 3/1975 | Shiraishi et al. | 350/96.34 |
| 4,165,915 | 8/1979 | Rau et al. | 350/96.34 |
| 4,277,271 | 7/1981 | Krohn | 350/96.31 X |
| 4,294,514 | 10/1981 | Schneider | 350/96.31 |

FOREIGN PATENT DOCUMENTS

| | | |
|---|---|---|
| 1901053 | 6/1970 | Fed. Rep. of Germany . |
| 2427351 | 1/1976 | Fed. Rep. of Germany ... 350/96.31 |
| 52-35653 | 3/1977 | Japan ................. 350/96.33 |
| 52-33744 | 3/1977 | Japan ................. 350/96.30 |
| 52-71248 | 6/1977 | Japan ................. 350/96.34 |

*Primary Examiner*—John D. Lee
*Attorney, Agent, or Firm*—Sprung, Horn, Kramer & Woods

[57] ABSTRACT

In an optical fiber having a core whose material consists essentially of vitreous silica, said core having a jacket of plastic which is optically effective at least on a length of 10 m reckoned from the light input end of the fiber and which has a refractive index $n_M$ which is smaller than that of the core, the improvement wherein the core has an outer layer whose refractive index $n_{ext}$ is smaller than the refractive index $n_K$ of the remaining inner core portion which is constant and greater than the refractive index $n_M$ of the jacket, and next lies in the range from $n_K - (n_K - n_M) \cdot (0.25 \text{ to } 0.8)$ and whose thickness amounts to between 0.8 $\mu$m and 8 $\mu$m.

11 Claims, 2 Drawing Figures

OPTICAL FIBER

BACKGROUND OF THE INVENTION

1. Field of the Invention

The invention relates to an optical fiber having a core whose material consists essentially of vitreous silica, and having a jacket of plastic whose index of refraction $n_{jacket}$ is smaller than that of the core, and which is optically active at least on a length of 10 meters reckoned from the light-input end of the fiber.

2. Discussion of Prior Art

Optical fibers of the kind described above are known from U.S. Pat. No. 3,869,194. In the comparison to optical fibers whose core and jacket are of vitreous material, plastic-jacketed optical fibers have the advantage that they are less expensive to manufacture. The plastic-jacketed glass core optical fibers have a high numerical aperture in comparison to optical fibers having core and jacket of vitreous material.

At the interface between the core of vitreous material and the plastic jacket there occurs a total reflection of the light carried in the core of the fiber. The bonding together of the core and jacket material requires a maximum of care, and yet scatter losses are unavoidable at the interface between core and jacket on account of flaws, dust particles and the like.

Consequently, it has been proposed to reduce the scatter losses by replacing glass-core plastic-jacketed optical fibers with optical fibers consisting only of a core material. For this purpose, according to German Auslegeschrift No. 1,901,053, the outer layer of the core material has been modified by a diffusion process so that it acts as a jacket. In that case, however, the optical fiber is the same as those made only of vitreous materials having low numerical aperture.

It is the object of the invention to provide an optical fiber which, while retaining a high numerical aperture, provides better light guiding properties, i.e. having lower losses, than the known plastic-jacketed optical fibers, while at the same time retaining the advantage of low-cost manufacture.

SUMMARY OF THE INVENTION

This object is achieved in accordance with the invention, in an optical fiber of the kind described above, in that the core has an outer layer whose index of refraction $n_{ext}$ is smaller than the constant index of refraction $n_K$ of the remainder of the core and is greater than the refractive index of the jacket $n_{jacket}$, and $n_{ext}$ ranges from $n_K-(N_K-n_{jacket})\cdot(0.25\text{ to }0.8)$, and whose thickness is between 0.8 μm and 8 μm.

Preferably the optical fiber of the invention has an internal core of vitreous silica or doped vitreous silica of a refractive index between $n_D=1.4439$ and $n_D=1.4721$ whose thickness is between 50 and 500 μm. The refractive index of the internal core is constant. Juxtaposed thereto is an external portion of the core of thickness between 0.8 and 8 μm whose refractive index is less than that of the inner core and is in the range of $n_D=1.4597$ to $n_D=1.3592$. It is also made of vitreous silica (quartz). Over this external portion of the core there is a jacket of a plastic material especially of a silicone resin or polytetrafluoroethylene resin. The jacket has a thickness of 20 to 500 μm. It has a molecular weight in the region of 1,000 to 700,000, the molecular weight being measured by Determination of the viscosity technique. This plastic jacket has a refractive index of $n_D=1.338$ to $n_D=1.410$ at 20° C., and is less than the refractive index of the exterior portion of the core. Other polymeric materials which can be used include polyvinylidenfluoride, poly(perfluorethylenepropylene), poly(fluoralkylmethacrylate), polymethylsiloxane, polyamid, polyimid, polystyrene, acrylics.

An outer layer whose thickness amounts to 2 to 6 μm and whose refractive index $n_{ext}$ ranges from $n_K-(n_K-n_{jacket})\cdot(0.4\text{ to }0.6)$ has proven practical. Particularly good results are obtained from optical fibers of the invention in which the thickness of the outer layer is 4 μm and $n_{ext}=n_K-(n_K-n_{jacket})\cdot 0.5$. The refractive index of the outer layer of the core is advantageously constant over the entire thickness of the layer. The invention, however, also provides fibers in which the refractive index of the outer layer diminishes with increasing distance from the core axis. All that is required is that the refractive index be within the stated range.

Optical fibers have proven practical in which the outer layer of the core consists of vitreous silica doped with fluorine or boron. The inner portion of the core of the optical fiber of the invention consists of vitreous silica or of a vitreous silica doped with substances increasing the index of refraction. Germanium, phosphorus, titanium and aluminum compounds are used as substances which increase the index of refraction. If the inner portion of the core of the fiber of the invention consists of vitreous silica doped with substances increasing the refractive index, then an undoped vitreous silica can be used as the outer layer.

Optical fibers in accordance with the invention have the advantage that a substantial portion of the light input is totally reflected at the outer layer of the core whose refractive index and thickness complies with the stated specifications, while a lesser amount is totally reflected at the interface between the outer layer of the core and the plastic jacket. The last-mentioned lesser amount of light is no longer as great as it is in the known optical fibers having vitreous silica cores and plastic jackets, but neither is it negligibly small, which signifies that the plastic jacket of the optical fiber of the invention does have an optical effect. The fibers of the invention have a numerical aperture approximately equal to those of the known plastic-jacketed vitreous silica fibers, which corresponds to the difference between the refractive index of the inner core portion and that of the plastic jacket. In comparison with the known optical fibers having vitreous silica cores and plastic jackets, the optical fibers of the invention, with their special outer core layer, have a lower loss of light which, on a length of one kilometer, is approximately 50% lower than that of the known plastic jacketed vitreous silica fibers.

Silicone resins, such as for example the silicone resin KE 103 RTV of Shin-Etsu Chemicals, and polytetrafluorethylene have proven especially valuable as materials for the plastic jacket.

The known methods of manufacturing plastic-jacketed vitreous silica fibers, such as those described in U.S. Pat. No. 3,869,194, the disclosure of which is hereby specifically incorporated herein by reference, FIGS. 8 and 9 can be used for the production of the optical fibers of the invention. Instead of vitreous silica rod as the starting material, a rod can be used whose inner core consists of vitreous silica and whose outer layer consists of vitreous silica doped with fluorine. Such starting materials can be made, for example, by the method described in the German Auslegeschrift No. 2,536,456, corresponding to U.S. Pat. No. 4,165,915, the disclosures of which are, hereby, incorporated herein by reference specifically.

DESCRIPTION OF SPECIFIC EMBODIMENTS

Figure 1:
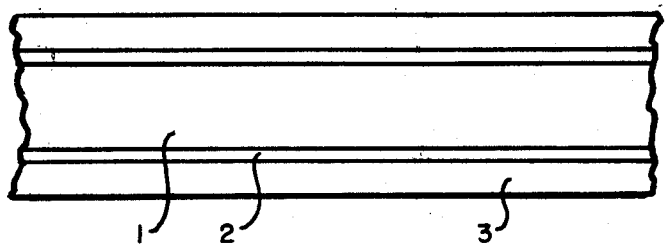
In FIG. 1 there is shown a longitudinal cross section through an optical fiber of the invention.

In FIG. 1, the inner core portion is identified by the reference number 1. It consists of vitreous silica, namely a synthetic vitreous silica obtained from gaseous silicon halides, which contains less than 10 ppm of hydroxyl ions and has total optical losses of less than 4 dB per kilometer, measured in the mass, in the near infrared spectral range. The outer layer 2 of the core consists of fluorine-doped, synthetic vitreous silica having a fluorine ion content of 5,000 to 40,000 ppm e.g. about 30,000 ppm, and less than 10 ppm of hydroxyl ions. The plastic jacket, which consists of silicone resin, is identified by the reference number 3.

Figure 2:
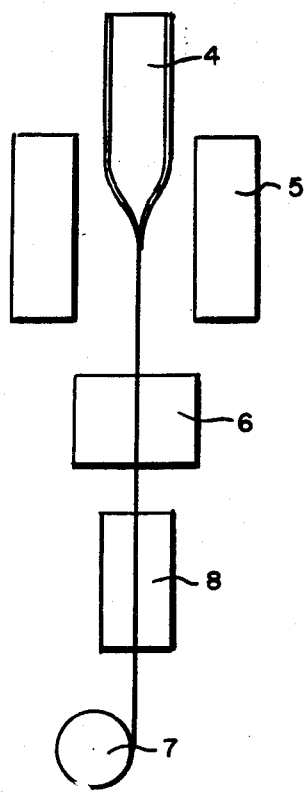
In FIG. 2 the method of manufacturing the fiber of the invention is represented diagrammatically.

The manufacture of the fibers of the invention can be understood from the diagrammatic representation in FIG. 2. The reference number 4 identifies a rod-shaped intermediate product consisting of an inner core portion of synthetic vitreous silica and an outer portion of fluorine-doped synthetic vitreous silica. The material make-up of the inner core portion and the outer layer are the same as indicated in FIG. 1. The rod 4 is disposed within a heating system 5 where it is heated to the drawing temperature. The drawn fiber then passes through a plastic coating apparatus 6 in which the jacket material of silicone resin is contained in the fluid state. The fiber emerging from apparatus 6 then has the make-up represented in FIG. 1. It can then be wound onto a drum 7 in the conventional manner. If an extruder is used for the plastic coating apparatus, there is no need to provide a curing apparatus between the coating apparatus and the winding drum 7 as represented by the reference number 8 in the illustrated embodiment.

What is claimed is:

1. In an optical fiber having a core consisting essentially of vitreous silica, said core having jacket of plastic which is optically effective at least on a length of 10 m reckoned from the light input end of the fiber and which has a refractive index $n_M$ which is smaller than that of the core, the improvement wherein said core consists essentially of an inner portion and an outer portion, which are integral with one another and differ with respect of their refractive indices, said outer portion consisting essentially of vitreous silica having a refractive index $n_{ext}$ which is smaller than the refractive index $n_K$ of the remaining inner portion but greater than the refractive index $n_M$ of said jacket, said vitreous silica of said core consisting essentially of synthetic vitreous silica made from silicon halides, the OH-content of said synthetic vitreous silica amounting to less than 10 ppm, and wherein $n_{ext}$ lies in the range from $n_K - (n_K - n_M) \cdot (0.25$ to $0.8)$, the thickness of said outer portion amounts between 0.8 μm to 8 μm and the thickness of said inner portion is greater than the thickness of said outer portion.

2. Fiber of claim 1, wherein the refractive index of the outer layer of the core is constant over the entire layer thickness.

3. Fiber of claim 1, wherein the refractive index of the outer layer of the core diminishes with increasing distance from the core axis.

4. Fiber of claim 1, wherein the outer layer of the core consists essentially of fluorine- or boron-doped vitreous silica.

5. Fiber of claim 1, wherein the inner core portion consists essentially of vitreous silica doped with a substance which increases the refractive index thereof.

6. Fiber of claim 1, wherein the outer layer of the core consists essentially of vitreous silica and the inner core portion consists essentially of vitreous silica doped with a substance which increases the index of refraction.

7. Fiber of claim 1, wherein the outer layer has a refractive index $n_{ext}$ which lies in the range of $n_K - (n_K - n_M) \cdot (0.4$ to $0.6)$ and its thickness amounts to 2 to 6 μm.

8. Fiber of claim 1, characterized in that the plastic jacket consists of silicone resin or polytetrafluoroethylene.

9. An optical fiber according to claim 1 wherein said inner portions's thickness is between 50 and 500 μm.

10. An optical fiber according to claim 9 wherein the refractive index of the inner portion is between 1.4439 and 1.4731 and is constant.

11. An optical fiber according to claim 10 wherein said outer portion's refractive index is between 1.4597 and 1.3592.

* * * * *